United States Patent [19]

Firuz et al.

[11] Patent Number: 5,695,156

[45] Date of Patent: Dec. 9, 1997

[54] AIRCRAFT VERTICAL POSITION CONTROL SYSTEM

[75] Inventors: Guner Firuz, Bellevue; Dwight R. Schaeffer, Mercer Island, both of Wash.

[73] Assignee: The Boeing Company, Seattle, Wash.

[21] Appl. No.: 441,284

[22] Filed: May 15, 1995

[51] Int. Cl.[6] .................................................. G05D 1/08
[52] U.S. Cl. ........................... 244/180; 244/181; 244/175
[58] Field of Search ..................................... 244/180, 181, 244/182, 76 R, 175; 364/434, 433; 318/584

[56] References Cited

U.S. PATENT DOCUMENTS

| | | | |
|---|---|---|---|
| 3,545,703 | 12/1970 | Montvale | 244/180 |
| 3,596,855 | 8/1971 | Barling . | |
| 3,627,236 | 12/1971 | Hess | 244/182 |
| 4,114,842 | 9/1978 | Hofferber et al. | 318/584 |
| 4,127,248 | 11/1978 | Boone et al. | 318/584 |
| 4,357,663 | 11/1982 | Robbins et al. | 244/182 |
| 4,377,848 | 3/1983 | Flannigan et al. . | |
| 4,536,843 | 8/1985 | Lambregts . | |
| 4,633,404 | 12/1986 | Greeson et al. | 318/584 |
| 5,079,711 | 1/1992 | Lambregts et al. | 364/433 |
| 5,117,362 | 5/1992 | Peckham et al. . | |

*Primary Examiner*—Andres Kashnikow
*Assistant Examiner*—Tien Dinh
*Attorney, Agent, or Firm*—Christensen O'Connor Johnson & Kindness PLLC

[57] ABSTRACT

Aircraft input signals of selected altitude ($h_s$), selected vertical speed ($\dot{h}_s$), current altitude (h), current vertical speed ($\dot{h}$), current pitch attitude ($\theta$), current normal acceleration ($N_z$) and current pitch rate (Q) are processed to produce an elevator command ($\delta_e$) that will result in a smooth vertical transition of the aircraft for various autopilot vertical maneuvers, including altitude capture and hold, glideslope capture and hold, and flare control.

18 Claims, 6 Drawing Sheets

AIRCRAFT VERTICAL POSITION CONTROL SYSTEM

FIELD OF THE INVENTION

This invention relates generally to flight control systems for aircraft and, more particularly, to an apparatus and method for generating an elevator command to control the aircraft to a desired vertical trajectory.

BACKGROUND OF THE INVENTION

Automatic flight control systems for aircraft have for many years included the capability of causing the aircraft to automatically capture and hold a selected altitude or glideslope. This has typically been accomplished by an autopilot that computes signals that cause the aircraft control surfaces to perform according to the control laws implemented within the autopilot. These systems have performed with varying degrees of success. Some autopilots are at least somewhat deficient in performance, though, due to an inability to effectively handle certain initial engage conditions. For instance, if the aircraft were outside the selected altitude capture limits imposed by the control law, then automatic capture would be impossible, or, if possible, would produce a flight path that could only be accomplished in an extended, oscillatory manner, or that exceeds desirable g limits.

Therefore recent autopilots compute a circular flight path, or command trajectory in space, to which the autopilot controls the aircraft. Using a circular computed trajectory allows the autopilot to limit the acceleration force on the aircraft during the maneuver to a constant g force and to eliminate oscillatory behavior. However, the transition from constant g force to zero g force is abrupt at the end of the maneuver, causing transients in the aircraft response.

Another disadvantage of current systems is that separate computation methods (i.e., control laws) are required for generating a command trajectory and its corresponding control commands for different modes of aircraft maneuvers, e.g., altitude capture and hold, glideslope capture and hold, and flare control. These maneuvers are all a form of vertical position control. Using separate control laws for these maneuvers is inefficient in that it requires additional analysis and implementation components. Further, separate control laws cause an increase in autopilot computation time and in the likelihood of potential transients.

SUMMARY OF THE INVENTION

The present invention provides a vertical position control system ideally suited for use during various vertical control maneuvers, including altitude capture and hold, glideslope capture and hold, and flare control. The aircraft vertical position control system apparatus receives input signals of selected altitude, selected vertical speed, current altitude, current vertical speed, current pitch, normal acceleration, and current pitch rate. Such input signals are processed to produce an elevator pitch command resulting in a smooth non-oscillatory transition from the aircraft's current flight path to the new flight path. The system of the present invention also limits the acceleration forces experienced by the aircraft in order to avoid passenger discomfort and undesirable stress on the airplane.

In accordance with the control law of the vertical position control system of the present invention, an optimal command trajectory altitude and vertical speed are calculated and compared with the aircraft's current altitude and vertical speed to form a proportional pitch attitude command. The proportional pitch attitude command is combined with an integral pitch attitude command formed in an integral path to produce an overall pitch attitude command. The overall pitch attitude command is compared to the current pitch attitude to obtain the pitch error. The pitch error, current normal acceleration, and current pitch rate are modified by appropriate filters and are then combined to produce the elevator command. Elevator adjustment based on the resulting elevator command causes a smooth, non-oscillatory transition from the aircraft's current flight path to the new flight path.

A command processor computes the command trajectory in terms of commanded altitude and commanded vertical speed based on the input signals to the vertical position control system. A first combiner subtracts the current altitude from the commanded altitude to produce a differential commanded altitude signal. A second combiner subtracts the current vertical speed from the commanded vertical speed to produce a differential commanded vertical speed signal. A third combiner combines the differential commanded altitude signal (as modified by an attitude gain factor) with the differential commanded vertical speed signal (as modified by a vertical speed gain factor) to produce the proportional pitch attitude command.

Stated in more general terms, the command processor includes a transfer function having a second order filter with first and second lead terms to thereby eliminate steady state error in commanded altitude and commanded vertical speed during ramp inputs for selected altitude. These features allow the vertical position control system to be used during various vertical maneuvers. The command processor further includes synchronization of the initial values of the current altitude and vertical speed logic, limiting and adjusting the commanded vertical acceleration of the aircraft, and logic for varying the damping ratio. These aspects work to limit the acceleration forces experienced by the aircraft and passengers.

In accordance with yet other aspects of the present invention, the acceleration of the aircraft is varied according to the natural frequency $\omega_n$, which is a function of at least one of the following system parameters: current altitude, current vertical speed, selected altitude, and selected vertical speed. The damping ratio is also preferably adjusted as a function of the above terms.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 3a, 3b, and 3c are control diagrams of a command processor formed according to the teachings of the present invention;

DETAILED DESCRIPTION OF THE PREFERRED EMBODIMENT

As is conventional, the invention herein is illustrated and described partially in the form of a control law containing discrete blocks designed to accomplish specific functions. It is to be understood that the invention can be actually implemented in various ways. For example, the various functions and means of the illustrated control law can be carried out by a suitably programmed digital computer system. Alternatively, the functions can be carried out by digital or analog circuits.

Figure 1A:
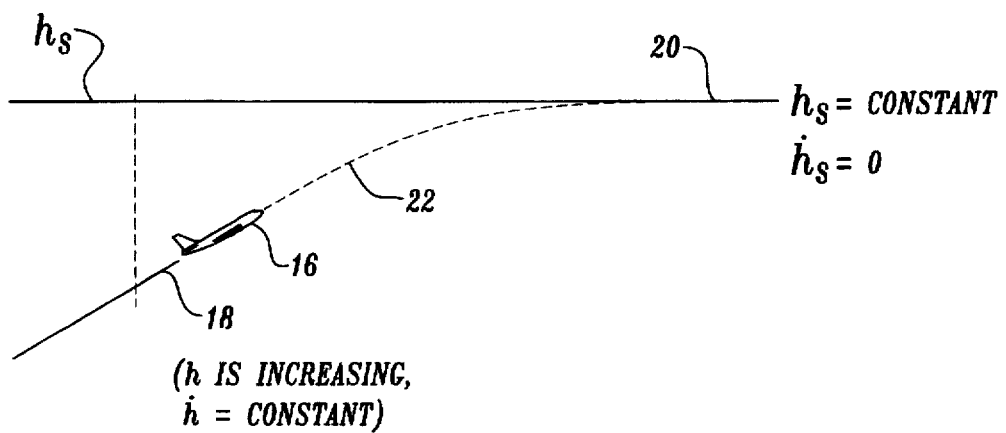
FIGS. 1a and 1b illustrate exemplary command trajectories generated using a vertical position control system formed according to the teachings of the present invention.
Figure 1B:
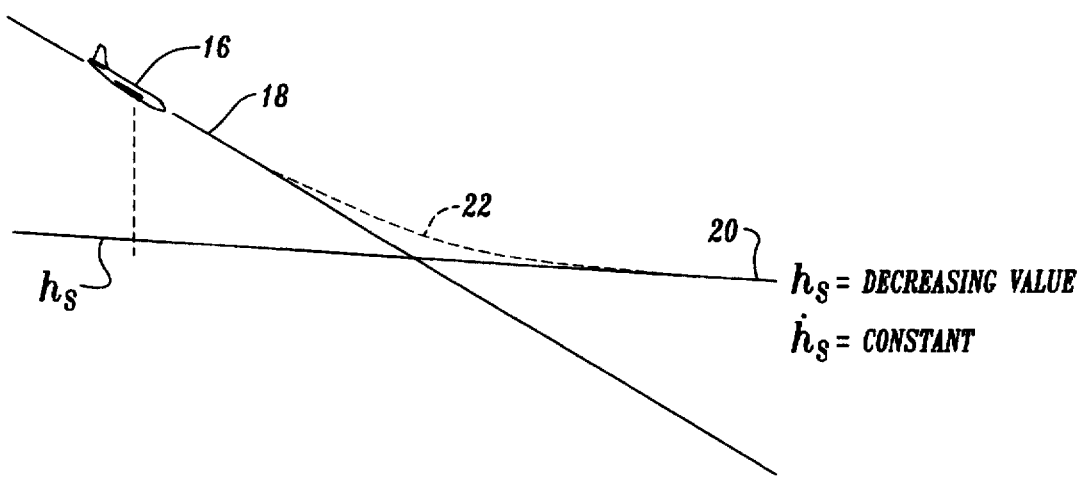

With reference to FIGS. 1a and 1b, during normal flight conditions of an aircraft 16, there may be instances where a very large change, or step input, in altitude and/or vertical speed is required. Obviously, the aircraft is not capable of immediately making such a large change. Therefore, a command trajectory 22 based on a changing commanded altitude $h_c$ and commanded vertical speed $\dot{h}_c$ is established to guide the aircraft vertically so as to perform a smooth transition from the current flight path 18 to a new flight path 20. A key feature of the present invention is the formulation of the commanded altitude $h_c$ and commanded vertical speed $\dot{h}_c$ used to determine proportional pitch attitude command $\Delta\theta_c$ which will result in adjustment of the aircraft control surfaces, such as elevators, so that the aircraft will follow the desired trajectory.

Still referring to FIGS. 1a and 1b, flight of the aircraft 16 along flight path 18 is determined in part by a set of vertical parameters that characterize its vertical orientations, including current aircraft altitude $h$ and vertical speed $\dot{h}$. When a signal (e.g., a new selected altitude $h_s$ and/or new selected vertical speed $\dot{h}_s$) is generated to instruct the autopilot to guide the aircraft 16 to a new flight path 20, the system of the present invention computes the commanded altitude $h_c$ and vertical speed $\dot{h}_c$ that results in the command trajectory 22. Such trajectory allows the aircraft to transition to or "capture" the new path 20. When the initiating signal is generated, that time is generally referred to as time $t=0$, or the time of engagement. By considering a variety of factors, discussed below, the aircraft 16 is caused to follow a smooth, non-oscillatory transition from one flight path to another; unencumbered by excessive g forces or steady-state errors.

It should be understood that the signal for initiating a transition between a current flight path 18 and a new path 20 is external to the vertical position control system and may come from various sources. For example, the pilot may directly command the new path 20 via flight deck controls (e.g., via altitude select knob, approach knob, rite vertical speed mode select, etc.), or the signal may come from a flight management computer, or, the signal may be received from other sources such as a remote controller through a communication link.

FIG. 1a illustrates an example of a vertical operation starting at a constant climb and transitioning to a constant flight altitude. The initial conditions are defined by the flight path 18 having one set of characteristics, where $h$ is increasing and $\dot{h}$ is constant. The new path 20 has another set of characteristics, where $h_s = $ a constant$>h$ and $\dot{h}_s$ is a constant$= 0$. This type of vertical operation is frequently required during altitude capture and subsequent hold. FIG. 1b illustrates an example of a vertical operation starting at steady vertical speed and transitioning to a different steady vertical speed. Here, the initial conditions are defined by the flight path 18 having one set of characteristics, where $h$ is decreasing and $\dot{h} =$ constant; and the new path 20 in which $\dot{h}_s$ is decreasing at a different rate ($\dot{h}_s = $ a different constant). This type of vertical operation is frequently required during glideslope capture, glideslope hold, and flare maneuvers.

Figure 2:
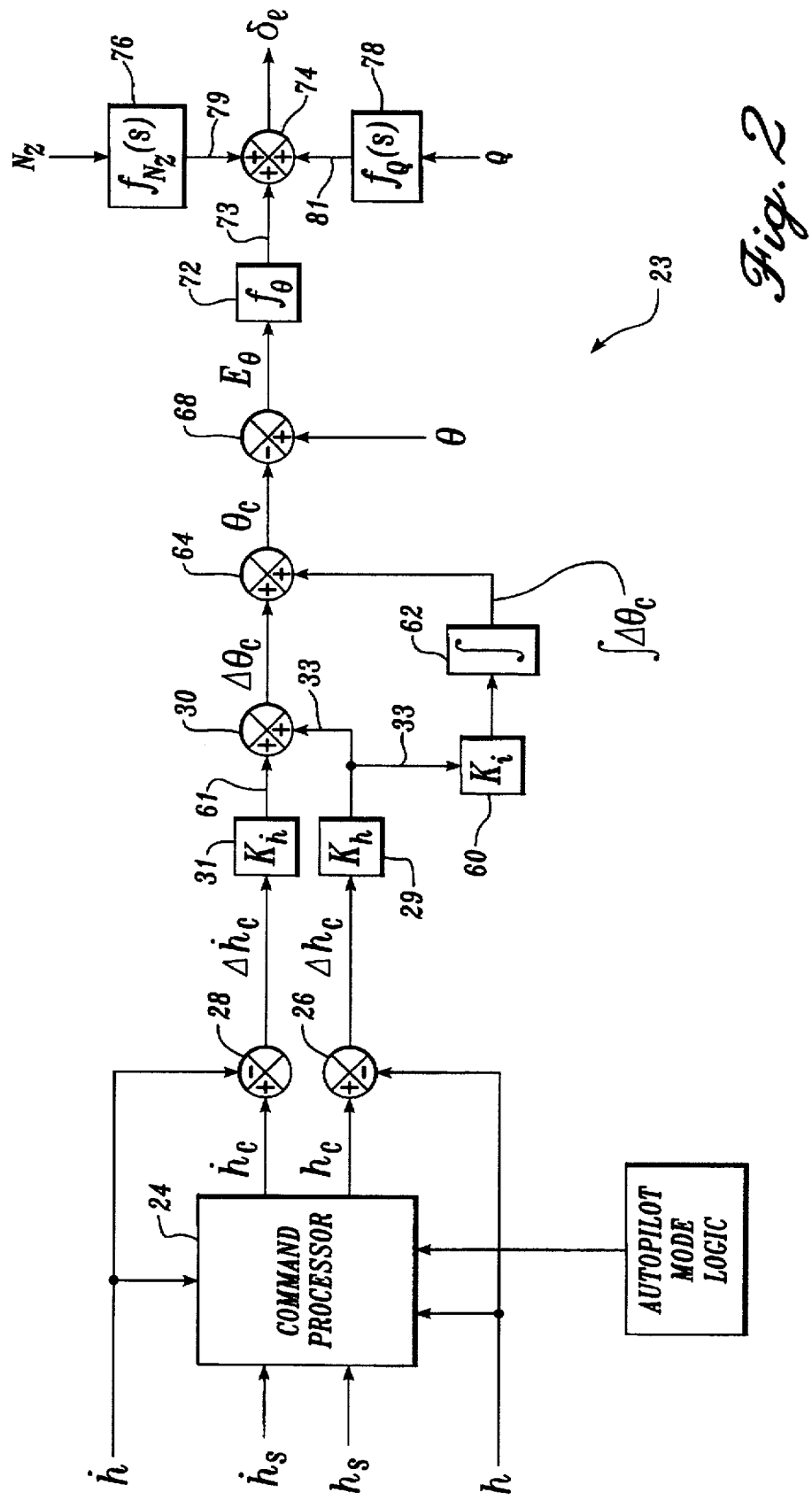
FIG. 2 is a diagram of a vertical position control system formed in accordance with the present invention, showing the formulation of proportional, integral, and elevator surface commands.

With reference to FIG. 2, the aircraft vertical position control system 23 in accordance with the present invention processes input signals of selected altitude $h_s$, selected vertical speed $\dot{h}_s$, current altitude $h$, and current vertical speed $\dot{h}$, to produce signals of commanded altitude $h_c$ and commanded vertical speed $\dot{h}_c$. The commanded altitude and vertical speed signals are combined with current altitude and vertical speed to produce a proportional pitch attitude command $\Delta\theta_c$. The current vertical speed and altitude values used by the system of the present invention may be presented in various forms and may come from various sources, including stored data, instantaneous sensor data, computed inertial or air data, or an analysis based on multiple sources.

The command processor 24 produces values for $h_c$ (ft) and $\dot{h}_c$ (ft/sec) that will result in the aircraft following the optimal command trajectory 22 for a particular situation. A first combiner 26 subtracts the current altitude $h$ from the commanded altitude $h_c$ to produce a differential commanded altitude signal $\Delta h_c$. The term "combiner" is to be broadly interpreted, and includes signal combination in the digital or binary sense so that it includes addition, subtraction, multiplication, and division. These combiners may comprise analog devices, such as summing amplifiers or transistors, or they may comprise digital devices, such as binary adder-subtracters, comparators, or shift registers in an arithmetic logic unit of a central processing unit. In the preferred embodiment, combiners are summing junctions.

A second combiner 28 subtracts the current vertical speed $\dot{h}$ from commanded vertical speed $\dot{h}_c$ to produce a differential commanded vertical speed signal $\Delta \dot{h}_c$. As indicated at blocks 29 and 31, the differential commanded altitude signal $\Delta h_c$ and the differential commanded vertical speed signal $\Delta \dot{h}_c$ are respectively modified (multiplied by an altitude gain $K_h$ and a vertical speed gain $K_{\dot{h}}$. The values of $K_h$ and $K_{\dot{h}}$ should preferably be based, at least in part, on inverse true airspeed ($1/V_{TAS}$). The values for $K_{\dot{h}}$ and $K_h$ may be related in any manner desirable, depending on the particular application. For a Boeing 777-200 aircraft, the optimum value of $K_{\dot{h}}$ has been found to be related to $K_h$ by the following equation, $$K_{\dot{h}} = 0.5\, K_h + 0.2,$$

where $K_h = 0.038 + 15/V_{TAS}$ (where $V_{TAS}$ is true airspeed).

A third combiner 30 adds the modified differential vertical speed signal 61 to the modified differential commanded altitude signal 33 to produce a proportional pitch attitude command $\Delta\theta_c$, preferably in units of degrees. As can be seen in FIG. 2 the modified differential commanded altitude signal 33 branches to a separate path and is multiplied by a gain $K_j$ at block 60 and an integrator 62. The result is the integral pitch attitude command $\int \Delta\theta_c$ which is summed with the proportional pitch attitude command $\Delta\theta_c$ to produce an overall pitch attitude command $\theta_c$. The loop modifying the differential commanded altitude signal 31 functions to provide zero steady state error on the vertical position and is generally referred to herein as an integral path. It is selected from only the altitude portion of the proportional pitch attitude command $\Delta\theta_c$ because the altitude steady state control is desired in altitude, glideslope and flare maneuvers.

A fourth combiner 68 determines the difference between the pitch attitude command $\theta_c$ and the current pitch attitude $\theta$. The difference is the pitch error $E_\theta$. The difference between the optimum pitch attitude $\theta_c$ and the actual pitch attitude θ is then multiplied by a gain $\int_\theta$ at 72 to form a pitch attitude error signal 73, the purpose of gain $\int_\theta$ being to enable the altitude control bandwidth and to appropriately augment the aircraft's short period response, and is preferably a function of impact pressure.

A fifth combiner 74 combines the pitch attitude error signal 73 with a filtered normal acceleration signal 79 and a filtered current pitch rate signal 81 to produce an elevator command $\delta_e$. Signal 79 is preferably produced by modifying the current normal acceleration $N_z$ by a function $\int_{N_z}(s)$ at multiplier 76, designed to augment the short period frequency and damping. Signal 81 is preferably formed by modifying the current pitch rate Q by a function $\int_Q(s)$ at multiplier 78, designed to enable the altitude control bandwidth and appropriately augment the short period frequency and damping.

Transfer functions and/or shaping filters may be applied at other points in the present invention as required by a particular application or as preferred for a particular effect.

As mentioned above, the elevator command $\delta_e$ generated by the vertical position control system 23 is used to adjust the elevator position, which subsequently affects aircraft pitch performance. Analog or digital sensors track the altitude h and vertical speed ḣ of the aircraft and thereby sense changes in aircraft altitude and vertical speed caused by the movement of the elevators. In this manner, the inputs to the vertical position control system 23 serve as system feedback when re-entered into the vertical position control system 23.

The concepts of gains and/or of transfer functions are used at several points throughout the system and method of the present invention as depicted in the preferred embodiments. The concept of a transfer function as used herein is to be interpreted broadly to include time lags or unit step functions, amplification (linear or non-linear), attenuation, ramp functions, integration, gains, and the like. These transfer functions in their various forms often are expressed mathematically in Laplace transform notation and can be realized in analog or digital form. Examples of analog means include linear amplifiers, capacitors, inductors, resistors and networks including some or all of these devices. Examples of digital means include binary adder-subtractors, comparators, inverters, controlled counters, and digital processors that sequentially process digitally encoded data.

The following discussion concerns the preferred command processor of the preferred vertical position control system 23 and is divided into four sections. The first section discusses the basic structure and control laws of the command processor 24 of the present invention. The second section discusses the additional portions of the command processor for elimination of steady state error that otherwise would result in response to a ramp altitude input. The third section addresses the selection of a natural frequency to control maximum acceleration commanded by the command processor and the use of acceleration limiting terms. The fourth section discusses the formation of initial condition values and how terms are set to those initial condition values.

1. Basic Structure of the Command Processor

Figure 3A:
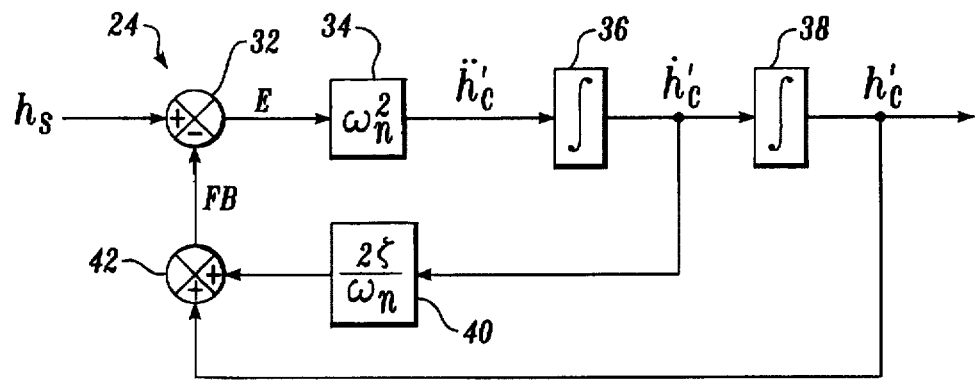
Figure 3B:
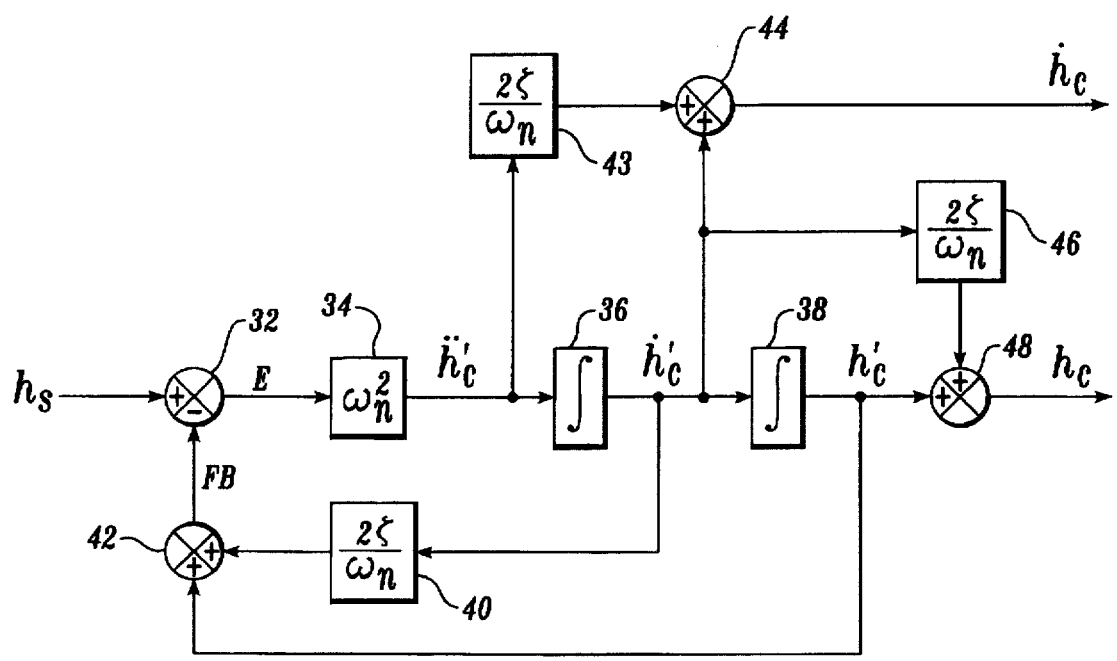
Figure 3B:
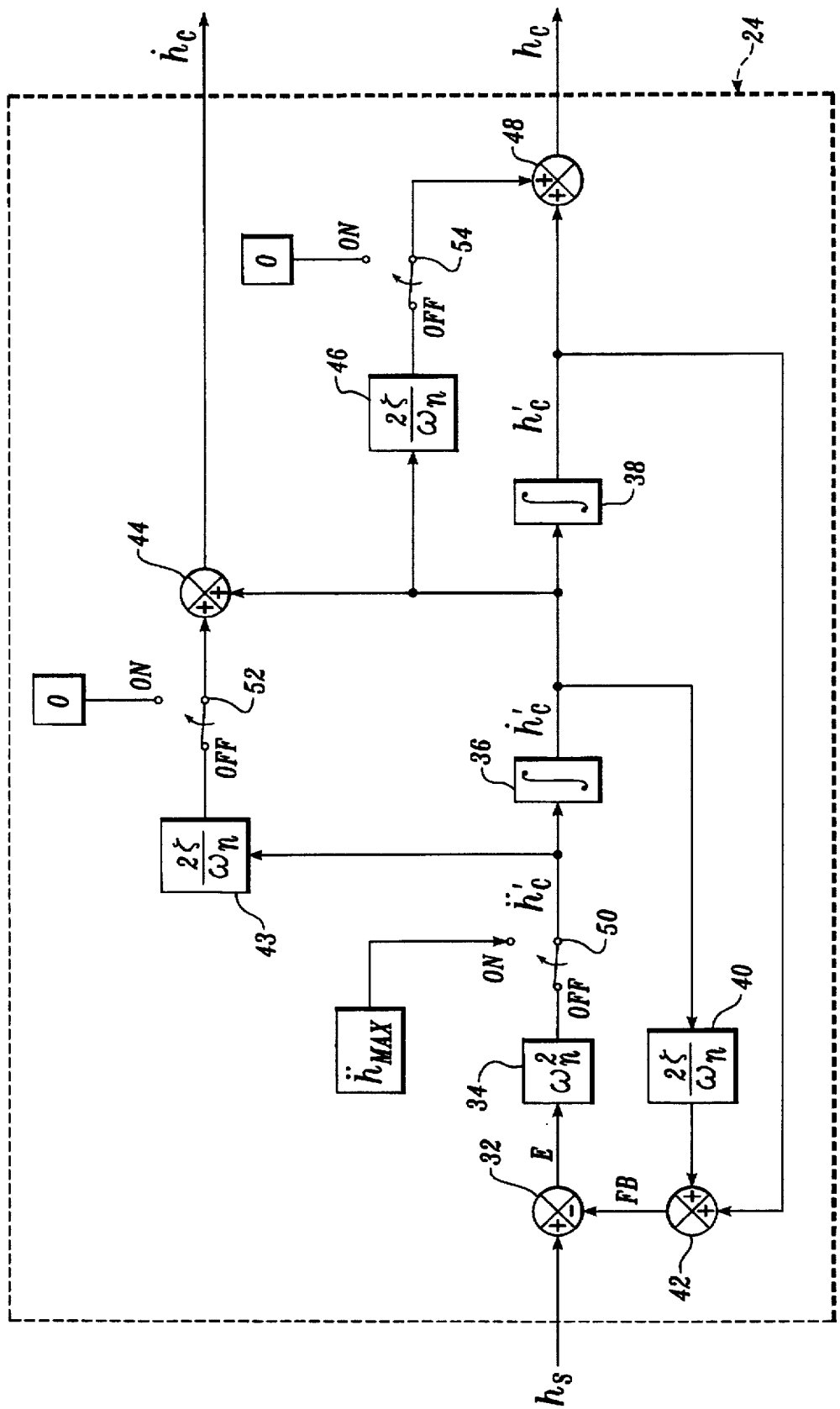

FIGS. 3a, 3b, and 3c are control diagrams illustrating various aspects of the command processor 24. Specifically, FIG. 3c shows the preferred command processor 24. FIG. 3a is a control diagram of the command processor 24 in its simplest or basic form and FIG. 3b illustrates the invention embodied for elimination of steady state error. In each of the depicted arrangements, the command processor 24 receives the value of selected vertical altitude $h_s$ to determine the commanded vertical altitude $h_c$ and commanded vertical speed $\dot{h}_c$.

In FIG. 3a, the input to the command processor 24 is the selected altitude $h_s$, which is the altitude of the extrapolated new flight path 20 directly above or below the aircraft 16 (see FIGS. 1a and 1b). The selected altitude $h_s$ is supplied to a combiner 32 which produces an error signal E by subtracting a feedback component FB from the selected altitude $h_s$. Determination of FB is discussed below. The error E is preferably multiplied by the square of the natural (undamped) frequency, $\omega_n^2$, at multiplier 34. The result is an intermediate commanded vertical acceleration $\ddot{h}'_c$. Next, $\ddot{h}'_c$ is integrated by a first integrator 36 to produce an intermediate commanded vertical speed $\dot{h}'_c$. Then $\dot{h}'_c$ is integrated by a second integrator 38, resulting in an intermediate commanded vertical altitude $h'_c$.

The feedback component FB results from the sum (provided by at combiner 42) of the intermediate commanded vertical speed $\dot{h}'_c$ as modified at a multiplier 40, with the intermediate commanded vertical altitude $h'_c$. The preferred modification of the intermediate commanded vertical speed $\dot{h}'_c$ is its multiplication by $$\frac{2\zeta}{\omega_n}$$

in units of sec/radians, where $\omega_n$ is the natural frequency and $\zeta$ is the damping ratio of the resulting control law.

It can be noted that the control diagram of FIG. 3a can be mathematically expressed as a second order filter function of the form:

$$\ddot{h}'_c(t) = \omega_n^2[h_s(t) - h'_c(t)] - 2\zeta\omega_n\dot{h}'_c(t) \tag{1}$$

Taking the Laplace transform of equation (1) yields the following equation.

$$h'_c(s) = \frac{\omega_n^2 h_s(s)}{s^2 + 2\zeta\omega_n s + \omega_n^2} + \frac{\dot{h}'_c(0) + h'_c(0)(s + 2\zeta\omega_n)}{s^2 + 2\zeta\omega_n s + \omega_n^2} \tag{2}$$

The first term of equation (2) expresses system response due to the selected altitude input $h_s$, whereas the second term of equation (2) expresses system response attributable to the initial conditions; $\dot{h}'_c(0)$ and $h'_c(0)$ being the initial values of the commanded altitude and commanded vertical speed, at t=0, which is the time of engagement.

2. Removal of Steady State Error in Response to a Ramp Input

To allow transitioning of the aircraft to a new path 20 during a variety of vertical maneuvers, a vertical position control system must accommodate commands to transition from one vertical speed to a new selected vertical speed, as well as commands to transition between a current and selected altitude. However, if the input selected vertical speed is a constant such that the altitude is a ramp input with a slope of $\dot{h}_s$ (i.e., $h_s(t)=h_s(0)+\dot{h}_s(t)$), the response of the transfer function set forth in equations (1) and (2) will include a steady state error $e_{ss}$ equal to $$\frac{2\dot{h}_s}{\omega_n}$$

for $\zeta=1$.

FIG. 3b illustrates the arrangement by which the invention eliminates the steady state error $e_{ss}$ from commanded vertical speed $\dot{h}_c$. In FIG. 3b, the intermediate commanded vertical acceleration $\ddot{h}'_c$ is modified at multiplier 43 by a first lead term and combined at a combiner 44 with the intermediate commanded vertical speed $\dot{h}'_c$ to form the commanded vertical speed $\dot{h}_c$. Thus, the commanded vertical speed $\dot{h}_c$ of FIG. 3b differs from the intermediate commanded vertical speed $\dot{h}'_c$ of FIG. 3a in that $\dot{h}_c$ includes a term involving the rate of change in commanded speed change, i.e., the intermediate commanded vertical acceleration $\ddot{h}'_c$. In the currently preferred embodiments, the first lead term of multiplier 43 is equal to $$\frac{2\zeta}{\omega_n}$$

(in units of seconds).

In a similar manner, to eliminate $e_{ss}$ from commanded vertical altitude $h_c$, the intermediate commanded vertical speed $\dot{h}'_c$ is modified at multiplier 46 by a second lead term and combined at combiner 48 with the intermediate commanded vertical altitude $h'_c$ to produce the commanded vertical altitude $h_c$. The second lead term of multiplier 46 is also preferably equal to $$\frac{2\zeta}{\omega_n}$$

(in units of seconds). Comparing the basic arrangement of FIG. 3a with FIG. 3b, it can be noted that the commanded vertical altitude signal $h_c$ of FIG. 3b differs from the intermediate commanded vertical altitude signal $h'_c$ of FIG. 3a by inclusion of a signal component that is related to the intermediate commanded vertical speed $\dot{h}'_c$.

When the first and second lead terms of multipliers 43, 46 are equal to $$\frac{2\zeta}{\omega_n}$$

and $\zeta$ equals 1, the time domain equations that describe signal processing accomplished by the command processor of FIG. 3b are as follows:

$$h_c(t) = h_s + \dot{h}_s t + \left[ h'_c(0) - h_s + \frac{2\dot{h}_c(0)}{\omega_n} \right] e^{-\omega_n t} - \quad (3)$$

$$[\dot{h}'_c(0) + \dot{h}_s + h'_c(0)\omega_n - h_s\omega_n]t e^{-\omega_n t}$$

$$\dot{h}_c(t) = \dot{h}_s + [-\dot{h}_s + 2\omega_n \dot{h}_s - 2\omega_n \dot{h}'_c(0) - 3\ddot{h}'_c(0)]e^{-\omega_n t} + \quad (4)$$

$$\omega_n[\dot{h}'_c(0) - \dot{h}_s - \omega_n h_s + \omega_n h'_c(0)]t e^{-\omega_n t}$$

$$\ddot{h}_c(t) = [3\omega_n^2 h'_c(0) - 3\omega_n^2 h_s + 4\omega_n \dot{h}'_c(0) + 2\omega_n \dot{h}_s]e^{-\omega_n t} - \quad (5)$$

$$\omega_n^2[\dot{h}'_c(0) + \dot{h}_s + \omega_n h'_c(0) - \omega_n h_s]t e^{-\omega_n t}$$

These equations define the command trajectory 22 profile that the aircraft 16 will follow when guided by the vertical position control system 23 of the present invention.

The Laplace transform of equation (3) may be expressed as follows:

$$h_c(s) = \frac{\omega_n^2 h_s(s)}{s^2 + 2\zeta\omega_n s + \omega_n} + \frac{2\zeta}{\omega_n} \dot{h}'_c(s) \quad (6)$$

The term $\zeta$ is the damping ratio and is generally related to how fast the vertical position control system 23 controls to the commanded vertical position. The damping ratio may be set to any desirable constant or may be a variable, calculated at the time of engagement or other convenient time. For the Boeing 777-200, the optimal value of the damping ratio $\zeta$ may be computed for the vertical maneuver of altitude capture and subsequent hold using the following expression:

$$\zeta_{Alt} = [40 - (h_s - h(0))]^2(0.001) + 1.0 \quad (7)$$

The optimal value of the damping ratio $\zeta$ for glideslope capture and subsequent hold is:

$$\zeta_{G/S} = 1.0 \quad (8)$$

The optimal value of the damping ratio $\zeta$ for flare control is:

$$\zeta_{Flare} = 1.05 \text{ to } 1.07 \quad (9)$$

The command processor receives a signal of the particular vertical maneuver desired from the autopilot mode logic (FIG. 2) and sets the damping ratio accordingly. Typically, the autopilot mode logic also will send the engagement signal.

Of course, the above values are representative; other values may be selected.

5. Selection of Natural Undamped Frequency $\omega_n$

Figure 4:
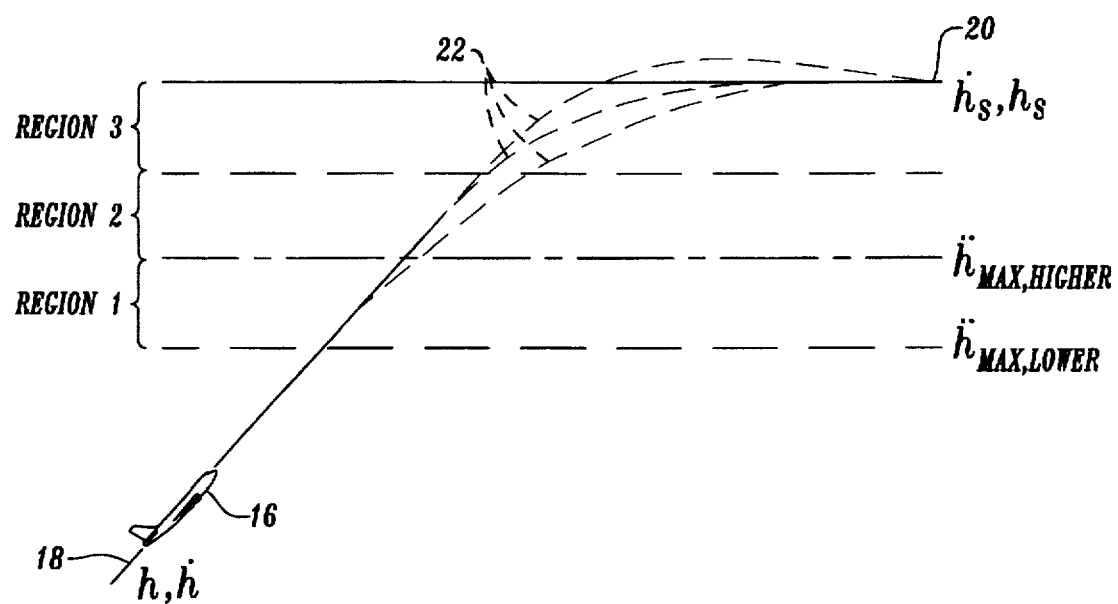
FIG. 4 illustrates various command trajectories that are produced according to the operational state of the aircraft when a new flight path is selected.

The acceleration required to capture and hold a newly selected altitude $h_s$ corresponds to the previously discussed intermediate commanded vertical acceleration $\ddot{h}'_c$ (from multiplier 34 in FIGS. 3a, 3b, and 3c). If the aircraft 16 is a substantial distance above or below a selected altitude $h_s$, it should experience only minimal acceleration, since gradual and constant ascent or descent may be used to bring the aircraft 16 to the selected altitude. Such distances define region 1, shown in FIG. 4. As the aircraft 16 reaches a point nearer to the selected altitude, the aircraft will experience larger accelerations while altering the flight path and attempting to capture the selected altitude $h_s$. Region 2 of FIG. 4 represents these distances. Nearer yet to the selected altitude $h_s$, it may not be possible for the aircraft 16 to capture a selected altitude without first overshooting it and without unacceptable g forces being applied. Such distances define region 3 of FIG. 4.

Because excessive acceleration, i.e., rapid transition to a new flight path, can cause discomfort for those flying inside the aircraft 16 and undue stress on a multitude of aircraft components, it is necessary to limit the amount of acceleration caused by a vertical position control system. The goal is to approach the new flight path at a vertical speed which decreases exponentially and therefore maintain a commanded maximum vertical acceleration. The value at multiplier 34, which is preferably related to natural frequency $\omega_n$, is the key to controlling the resulting acceleration, since it is the multiplier of the error term E that results in the intermediate commanded vertical acceleration term $\ddot{h}'_c$.

The present invention uses a combination of techniques to adjust the value of intermediate commanded vertical acceleration term $\ddot{h}'_c$, including varying the natural frequency $\omega_n$ and absolute limiting. Both of these techniques are discussed in detail below and are accomplished at the time of engagement. In general, the natural frequency $\omega_n$ of the command processor is determined according to the position of the aircraft within the various regions, which in turn, are defined according to the selected altitude $h_s$ and/or selected vertical speed $\dot{h}_s$. When the natural frequency is determined in the hereinafter described manner, the intermediate vertical acceleration term $\ddot{h}'_c$ is adjusted to efficiently capture a selected altitude without exceeding appropriate limits of vertical acceleration.

The derivation of the equations below is not included herein, but may be computed according to generally known principles of mathematics and control theory, when the following definitions and initial conditions (boundary conditions) are observed:

$h(0)$ = airplane altitude (ft) at the time of engagement,
$h_c(0) = h(0)$,
$\dot{h}(0)$ = airplane vertical speed (ft/sec) at the time of engagement,
$\dot{h}_c(0) = \dot{h}(0)$, $\dot{h}'_c(0) = \ddot{h}(0) - \dfrac{2}{\omega_n} \dddot{h}'_c(0)$, and $\dddot{h}'_c(0) = \dddot{h}(0) - 2\omega_n[h_s - h(0)]$, where $\omega_n$ is calculated as follows and $\zeta$ is set to 1 for simplicity.

Region 1 is a linear engagement start region. When the autopilot is signaled to accomplish a vertical maneuver and the aircraft is within region 1, the vertical position control system via the command processor will produce an elevator command that results in the experienced aircraft acceleration being between a lower maximum acceleration limit $\ddot{h}_{max, \, lower}$ and a higher maximum acceleration limit $\ddot{h}_{max, \, higher}$. The altitudes bounding region 1 thus correspond to the vertical distance required in order to transition to the new flight path while experiencing vertical acceleration of between $\ddot{h}_{max, \, lower}$ and $\ddot{h}_{max, \, higher}$.

Mathematically, region 1 lies within the following altitudes:

$$h_s - \dfrac{2[\dot{h}(0) - \dot{h}_s]^2}{\ddot{h}_{max, \, lower} \, e} \leq \text{Region 1 altitudes} < h_s - \dfrac{2[\dot{h}(0) - \dot{h}_s]^2}{\ddot{h}_{max, \, higher} \, e} \quad (10)$$

Where e is the natural logarithm (approximately 2.781), $\ddot{h}_{max, \, lower}$ is preferably a constant set to ±0.05 g (i.e., ±1.6 ft/s²), and $\ddot{h}_{max, \, higher}$ is preferably a constant set to ±0.1 g (i.e., ±3.2 ft/s²), the sign of either maximum acceleration depending on whether the aircraft is ascending or descending to capture the new flight path.

If the aircraft's position is within region 1, then the natural frequency $\omega_n$ of the command processor 24 is set as follows:

$$\omega_n = \dfrac{2[\dot{h}(0) - \dot{h}_s]}{h_s - h(0)} \quad (11)$$

Likewise, region 2 of FIG. 8 may be mathematically expressed as lying between the following altitudes:

$$h_s - \dfrac{2[\dot{h}(0) - \dot{h}_s]^2}{\ddot{h}_{max, \, higher} \, e} \leq \text{Region 2 altitudes} < h_s - \dfrac{[\dot{h}(0) - \dot{h}_s]^2}{2[\ddot{h}_{max, \, higher}]} \quad (12)$$

If the aircraft's position is within region 2 at the time of engagement, then the intermediate commanded vertical acceleration $\ddot{h}'_c$ is preferably limited to the higher maximum desirable vertical acceleration.

$$\ddot{h}'_c(0) = \ddot{h}_{max, \, higher} \quad (13)$$

This limiting of intermediate commanded vertical acceleration is accomplished by the command processor by setting the value of intermediate commanded vertical acceleration equal to $\ddot{h}_{max, \, higher}$ when an altitude change command is initiated and the aircraft is in operational region 2. Diagrammatically, this is indicated in FIG. 3c by a two-position switch 50. When the switch 50 changes state to supply a $\ddot{h}_{max}$ signal to the first integrator 36, additional switches 52 and 54 of FIG. 3c are activated so that the signal supplied to combiner 44 is zero (instead of the signal supplied by multiplier 43) and the signal supplied to combining unit 48 is also zero (instead of the signal supplied by multiplier 46). The value of $\omega_n$ is allowed to continue at its last value, since the transfer function is interrupted by switches 50, 52 and 54, and $\omega_n$ no longer affects $h_c$ or $\dot{h}_c$. The above actions cause the command processor to command a constant maximum vertical acceleration and to command a vertical speed command $\dot{h}_c$ and altitude command $h_c$ based upon first and second integrals, respectively, of the maximum commanded acceleration.

Once the following condition is satisfied, $$h_s - h(t^*) = \dfrac{[\dot{h}(t^*) - \dot{h}_s]^2}{\ddot{h}_{max, \, higher}} \quad (14)$$

the natural frequency $\omega_n$ of the command processor 24 is set as follows:

$$\omega_n = \dfrac{\dot{h}(t^*) - \dot{h}_s}{h_s - h(t^*)}, \quad (15)$$

where $t^*$ = the time at which equation (14) is satisfied.

and the switches 50, 52, and 54 are restored so that the system corresponds to FIG. 3b and linear operation starts.

Region 3 of FIG. 4 may be mathematically expressed as lying between the following altitudes:

$$h_s - \dfrac{[\dot{h}(0) - \dot{h}_s]^2}{2\ddot{h}_{max, \, higher}} \leq \text{Region 3 altitudes} \leq h_s \quad (16)$$

If the aircraft's position is within region 3 at the time of engagement, then the intermediate commanded vertical acceleration $\ddot{h}'_c$ is limited to the higher maximum desirable vertical acceleration and switches 50, 52 and 54 are switched on.

To minimize the overshoot experienced in capturing the selected altitude $h_s$, the switches 50, 52, 54 remain on until the following condition is met:

$$h(t^*) - h_s = 0 \quad (17)$$

at which time the switches 50, 52, and 54 are switched off, and the natural frequency is set to:

$$\omega_n = \sqrt{\dfrac{\ddot{h}_{max, \, higher}}{[h_s - h(t^*)]}} \quad (18)$$

where $t^*$ = the time at which equation (17) is satisfied.

Again, up until this time, $\omega_n$ is allowed to continue at its last value, since the transfer function is interrupted by the switches 50, 52, and 54, and $\omega_n$ no longer affects $h_c$ or $\dot{h}_c$.

It should be understood, however, that vertical acceleration of the aircraft may be manipulated using any one of a number of different methods. Part of the novelty of the present invention lies in the use of a variable natural frequency and not merely in the use of this particular preferred method of computing a variable natural frequency, although that described herein is novel also and is the presently preferred embodiment.

4. Setting of Initial Condition Values

Figure 5:
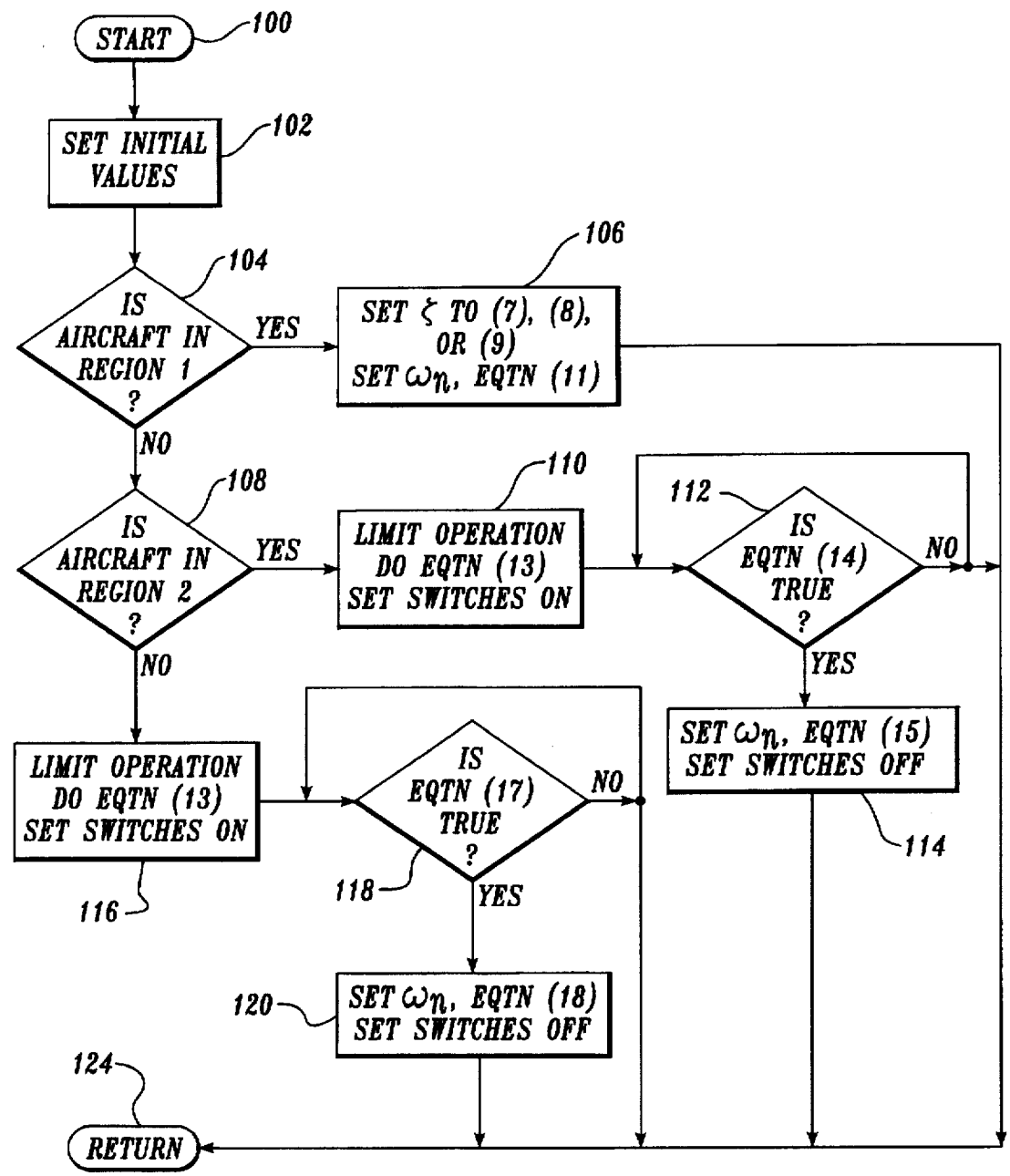
FIG. 5 is a flow chart that can be used for setting initial values of the command processor of FIG. 3c.

At the time of engagement, the command processor 24 follows the logic shown in the preferred embodiment of a flow chart of FIG. 5. The flow chart is useful in determining and setting initial condition values for terms of the command processor 24. At the start 100, the initial values of the following are set:

h(0)=aircraft altitude (ft) at the time of engagement, $$h_c(0) = h(0),$$

$\dot{h}(0)$ = aircraft vertical speed (ft/sec) at the time of engagement, $$\dot{h}_c(0) = \dot{h}(0),$$

$$\ddot{h}'_c(0) = \dot{h}(0) - \frac{2}{\omega_n} \ddot{h}'_c(0), \text{ and}$$

$$\ddot{h}'_c(0) = \dot{h}(0) - 2\omega_n[h_s - h(0)],$$

as instructed in block 102. Next, the command processor checks whether the aircraft 18 is within region 1 at block 104. If so, block 106 sets the value of natural frequency $\omega_n$ according to equation (11); and the damping ratio $\zeta$ according to the vertical maneuver as described in equations (7), (8), or (9). The command processor returns at block 124 to the control law of FIG. 3c to compute values for commanded altitude $h_c$ and commanded vertical speed $\dot{h}_c$. The vertical control system uses these values to calculate the elevator command $\delta_e$.

If the aircraft 18 is not in region 1, then the command processor checks whether the aircraft 18 is within region 2 at block 108. If so, block 110 allows the natural frequency $\omega_n$ to remain at its last value and sets the damping ratio $\zeta$ according to equations (7), (8), or (9). Additionally, the intermediate commanded vertical acceleration $\ddot{h}_c$ is set to the higher maximum desired acceleration $\ddot{h}_{max, higher}$ by switch 50 in FIG. 3c, and switches 52 and 54 go to zero. The command processor continually checks in block 112 as to whether equation (14) is true, and when so, allows block 114 to set the natural frequency $\omega_n$ according to equation (15) and switches 50, 52, and 54 turned off. In either case, the command processor 24 returns at block 124 to compute values for commanded altitude $h_c$ and commanded vertical speed $\dot{h}_c$. The vertical position control system 19 uses these values to calculate the elevator command $\delta_e$.

If the aircraft 18 is not in region 1, nor in region 2, then the command processor 24 assumes the aircraft 18 is within region 3. Block 116 sets the damping ratio $\zeta$ according to equations (7), (8), or (9), allows the natural frequency $\omega_n$ to remain at its last value, sets the intermediate commanded vertical acceleration $\ddot{h}'_c$ according to equation (13), and sets switches 50, 52, and 54 on. The command processor 24 continually checks as to whether equation (17) is true in block 118, and when so, allows block 120 to set the natural frequency according to equation (18) and the switches 50, 52, and 54 to off. In either case, the command processor 24 returns at block 124 to compute values for commanded altitude $h_c$ and commanded vertical speed $\dot{h}_c$. The vertical position control system 19 uses these values to calculate the elevator command $\delta_e$.

In the above manner, the command processor initializes values and computes the appropriate variables at the time of engagement and throughout the vertical maneuver.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A vertical position control system which receives input signals including selected altitude ($h_s$), selected vertical speed ($\dot{h}_s$), current altitude (h), and current vertical speed ($\dot{h}$), the control system including (a) a command processor that computes a command trajectory in terms of a commanded altitude ($h_c$) and a commanded vertical speed ($\dot{h}_c$), (b) a first combining unit for combining selected altitude ($h_s$) with commanded altitude ($h_c$) to produce a differential commanded altitude signal ($\Delta h_c$), (c) a first multiplier for converting the differential commanded altitude signal ($\Delta h_c$) into a proportional pitch attitude command ($\Delta \theta_c$), (d) a smoothing integrator having an output of pitch attitude command ($\theta_c$), (e) a second combining unit for combining the pitch attitude command ($\theta_c$) and a current pitch attitude ($\theta$) to form a pitch attitude error, and (f) a second multiplier for filtering the pitch attitude error, characterized in that the command processor includes a filter having a variable damping ratio.

2. A command processor receiving input signals including selected altitude ($h_s$), the command processor including (a) a second order filter that produces an intermediate vertical acceleration command ($\ddot{h}'_c$), an intermediate vertical speed command ($\dot{h}'_c$) and an intermediate altitude command ($h'_c$) and (b) first and second lead terms, the first lead term having an input including the intermediate vertical acceleration command ($\ddot{h}'_c$) and the intermediate vertical speed command ($\dot{h}'_c$) to form an output including a commanded vertical speed ($\dot{h}_c$), the second lead term having an input including the intermediate vertical speed command ($\dot{h}'_c$) and the intermediate altitude command ($h'_c$) to form an output including a commanded vertical altitude ($h_c$), the first and second lead terms for eliminating steady state error in commanded vertical altitude ($h_c$) and commanded vertical speed ($\dot{h}_c$) of the second order filter during ramp inputs of selected altitude ($h_s$), characterized in that the filter includes a variable damping ratio.

3. A method for creating an aircraft elevator command signal using input signals including selected altitude ($h_s$), selected vertical speed ($\dot{h}_s$), current altitude (h), and current vertical speed ($\dot{h}$), the method including (a) computing a command trajectory in terms of a commanded altitude ($h_c$) and commanded vertical speed ($\dot{h}_c$) based on the inputs signals according to a second order transfer function, (b) combining current altitude (h) with commanded altitude ($h_c$) to produce a differential commanded altitude signal ($\Delta h_c$), (c) applying an altitude gain ($K_h$) to the differential commanded altitude signal ($\Delta h_c$) to form a pitch attitude command ($\theta_c$), (d) combining the pitch attitude command ($\theta_c$) with a current pitch attitude ($\theta$) to produce a pitch attitude error ($E_\theta$), and (e) filtering the pitch attitude error ($E_\theta$) to produce an elevator command ($\delta_e$), characterized in that the second order transfer function includes a variable damping ratio.

4. A method of computing commanded vertical altitude ($h_c$) and commanded vertical speed ($\dot{h}_c$) using input signals including selected altitude ($h_s$), selected vertical speed ($\dot{h}_s$), current altitude (h), and current vertical speed ($\dot{h}$), the method including (a) applying a second order filter to the inputs of current altitude (h) and current vertical speed ($\dot{h}$) to produce the commanded vertical altitude ($h_c$) and commanded vertical speed ($\dot{h}_c$), and (b) eliminating steady state error in commanded altitude ($h_c$) and commanded vertical speed ($\dot{h}_c$) of the second order filter during ramp inputs for selected altitude ($h_s$) by using first and second lead terms with the second order filter, characterized in that the second order transfer function includes a variable damping ratio.

5. A processor for computing a commanded altitude and a commanded vertical speed for use in an aircraft vertical position control system, the processor receiving input signals including selected altitude ($h_s$), the processor including (a) a second order filter for producing the commanded vertical altitude and commanded vertical speed, the second order filter having a natural frequency and a damping ratio, and (b) first and second lead terms for eliminating steady state error from commanded vertical speed and commanded vertical altitude due to ramped selected altitude input signals, characterized in that the second order transfer function includes a variable damping ratio.

6. The processor according to claim 5, wherein the processor further receives a selected vertical speed input signal ($\dot{h}_s$) and the damping ratio is a function of the selected vertical speed input signal ($\dot{h}_s$).

7. The processor according to claim 6, wherein the processor further receives a current vertical speed input signal ($\dot{h}$) and the damping ratio is determined according to the equation $\zeta_{Alt}=[40-(\dot{h}_s-\dot{h}(0))]^2(0.001)+1.0$ during an altitude capture maneuver.

8. The processor according to claim 5, wherein the damping ratio is equal to about 1.0 during a glideslope capture maneuver.

9. The processor according to claim 5, wherein the damping ratio is equal to about 1.05 to 1.07 during a flare control maneuver.

10. An aircraft vertical position control system having a second order filter for computing a commanded altitude and a commanded vertical speed, characterized in that a variable damping ratio is provided for varying the responsiveness of the control system during intended flight maneuvers.

11. The control system according to claim 10, wherein the vertical position control system receives a selected vertical speed input signal ($\dot{h}_s$) and a current vertical speed input signal ($\dot{h}$), and the damping ratio is set according to the equation $\zeta_{Alt}=[40-(\dot{h}_s-\dot{h}(0))]^2(0.001)+1.0$ during an altitude capture maneuver.

12. The control system according to claim 10, wherein the damping ratio is equal to about 1.0 during a glideslope capture maneuver.

13. The control system according to claim 10, wherein the damping ratio is equal to between about 1.05 to 1.07 during a flare control maneuver.

14. A method of varying how fast a vertical position control system controls to a commanded vertical position during flight maneuvers, the vertical position control system receiving a selected vertical speed input signal ($\dot{h}_s$) and including a filter having a damping ratio, characterized in that the damping ratio varies according to different types of right maneuvers.

15. The method according to claim 14, wherein varying the damping ratio includes computing the damping ratio as a function of the selected vertical speed input signal ($\dot{h}_s$) during an altitude capture maneuver.

16. The method according to claim 18, wherein the vertical position control system further receives a current vertical speed input signal ($\dot{h}$) and the damping ratio is set according to the equation $\zeta_{Alt}=[40-(\dot{h}_s-\dot{h}(0))]^2(0.001)+1.0$ during the altitude capture maneuver.

17. The method according to claim 16, wherein varying the damping ratio includes setting the damping ratio equal to about 1.0 during a glideslope capture maneuver.

18. The method according to claim 14, wherein varying the damping ratio includes setting the damping ratio equal to between about 1.05 to 1.07 during a flare control maneuver.

* * * * *

UNITED STATES PATENT AND TRADEMARK OFFICE
CERTIFICATE OF CORRECTION

PATENT NO. : 5,695,156
DATED : December 9, 1997
INVENTOR(S) : G. Firuz et al.

It is certified that error appears in the above-indentified patent and that said Letters Patent is hereby corrected as shown below:

| COLUMN | LINE | |
|---|---|---|
| 12 (Claim 1, | 10 line 8) | "(h,)" should read --(h)-- |
| 12 (Claim 3, | 45 line 6) | "inputs signals" should read --input signals-- |
| 14 (Claim 14, | 18 line 7) | "right maneuvers." should read --flight maneuvers.-- |
| 14 (Claim 16, | 23 line 1) | "to claim 18," should read --to claim 15,-- |
| 14 (Claim 17, | 29 line 1) | "to claim 16," should read --to claim 14,-- |

Signed and Sealed this

Twenty-first Day of April, 1998

Attest:

BRUCE LEHMAN

Attesting Officer     Commissioner of Patents and Trademarks